(12) United States Patent  
Schieweg

(10) Patent No.: US 7,641,137 B2  
(45) Date of Patent: Jan. 5, 2010

(54) DISPERSING APPARATUS

(75) Inventor: Frank Schieweg, Reichshof (DE)

(73) Assignee: VMA-Getzmann GmbH, Reichshof (DE)

( * ) Notice: Subject to any disclaimer, the term of this patent is extended or adjusted under 35 U.S.C. 154(b) by 199 days.

(21) Appl. No.: 11/573,810

(22) PCT Filed: Aug. 6, 2005

(86) PCT No.: PCT/EP2005/008558

§ 371 (c)(1),
(2), (4) Date: Jul. 2, 2007

(87) PCT Pub. No.: WO2006/018168

PCT Pub. Date: Feb. 23, 2006

(65) Prior Publication Data

US 2008/0035770 A1     Feb. 14, 2008

(30) Foreign Application Priority Data

Aug. 19, 2004    (DE)   ............... 20 2004 013 056 U

(51) Int. Cl.
*B02C 17/16* (2006.01)

(52) U.S. Cl. .................................................. 241/172

(58) Field of Classification Search ............ 241/46.017, 241/172, 171, 29, 152.2, 153, 285.2
See application file for complete search history.

(56) References Cited

U.S. PATENT DOCUMENTS 5,346,147 A     9/1994    Ishikawa et al.

(Continued)

FOREIGN PATENT DOCUMENTS

DE     4425906     1/1996

(Continued)

OTHER PUBLICATIONS

International Search Report dated Nov. 21, 2005, received in corresponding PCT Application No. PCT/ EP05/008558, 3 pgs.

Written Opinion received in corresponding PCT Application No. PCT/EP05/008558, 6 pgs.

(Continued)

*Primary Examiner*—Mark Rosenbaum
(74) *Attorney, Agent, or Firm*—Grossman Tucker Perreault & Pfleger, PLLC

(57) ABSTRACT

In a dispersing apparatus comprising a container (10) for a dispersion material, a dissolve disc (22) drivable by a shaft (21) and a grinding device which contains a grinding medium and which has a perforated housing (34) through which dispersion material can pass by virtue of a flow generated by the dissolve disc (22), and an agitator tool which is drillable by a drive element and which is arranged in the housing (34) and is rotatable relative thereto, wherein the housing (34) surrounds the shaft (21), wherein the housing (34) is displaceable relative to the shaft (21) from a raised position into a lowered position and wherein the shaft (21) and the drive element can be coupled together by way of a coupling which has a first element (47) and a corresponding second element (53), which elements are in operative connection in the lowered position, in order to design same in such a way than a dispersing apparatus comprising a container (10) for a dispersion material, a dissolve disc (22) drivable by a shaft (21) and a grinding device which contains a grinding medium and which has a perforated housing (34) through which dispersion material can pass by virtue of a flow generated by the dissolve disc (22), and an agitator tool which is drivable by a drive element and which is arranged in the housing (34) and is rotatable relative thereto, wherein the housing (34) surrounds the shaft (21), wherein the housing (34) is displaceable relative to the shaft (21) from a raised position into a lowered position and wherein the shaft (21) and the drive element can be coupled together by way of a coupling which has a first element and a corresponding second element, which elements are in operative connection in the lowered position, in order to design same in such a way that it complies with coming anti-explosion regulations and is of a simple structure, it is proposed that the first element of the coupling is arranged at the lower end of the housing (34) and that the second element of the coupling is arranged in the region of a lower end of the shaft (21).

10 Claims, 3 Drawing Sheets

U.S. PATENT DOCUMENTS

Figure 1:
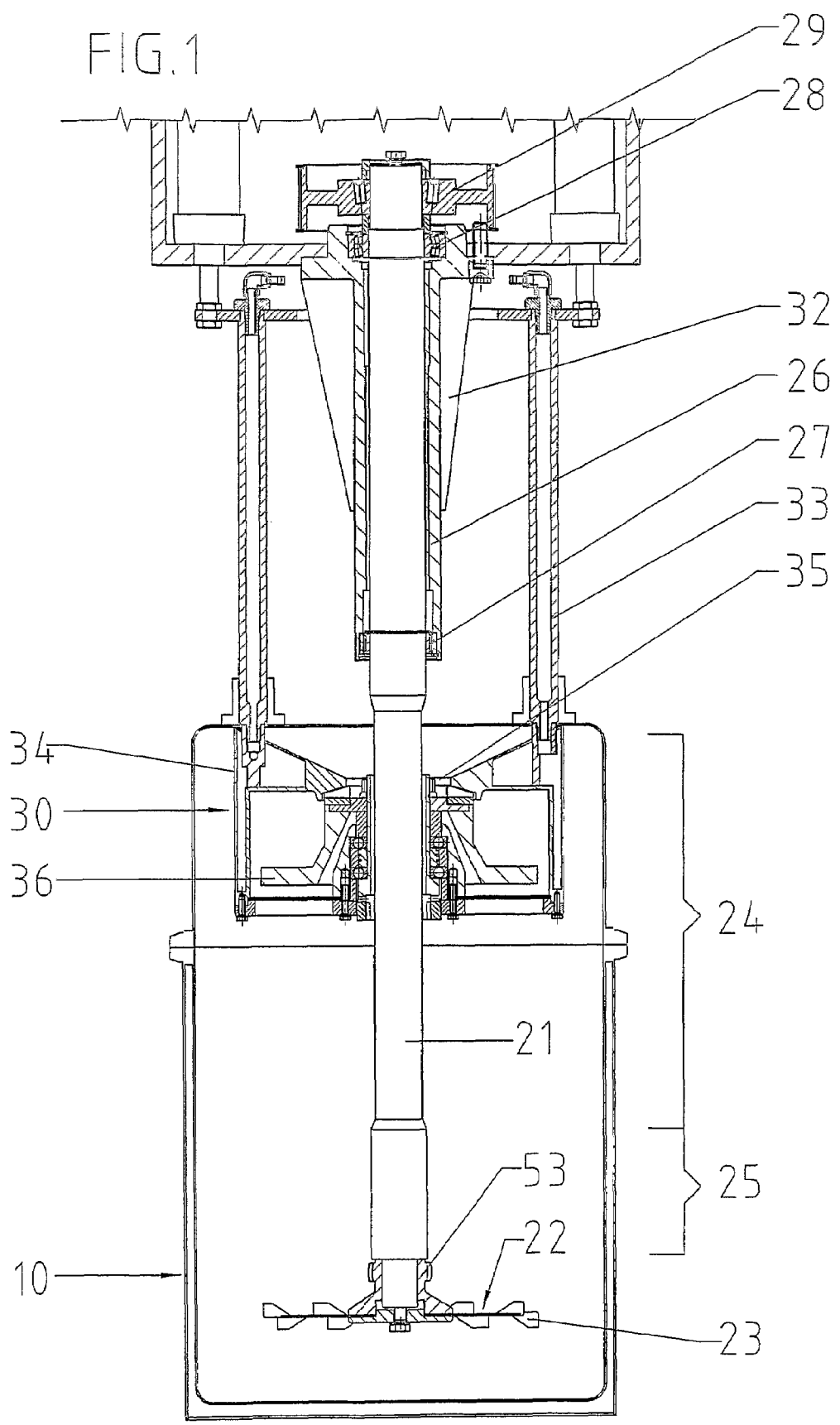

| | | |
|---|---|---|
| 5,967,430 A | 10/1999 | Getzmann |
| 6,565,024 B2 | 5/2003 | Getzmann et al. |
| 2003/0202724 A1 | 10/2003 | Harclerode |

FOREIGN PATENT DOCUMENTS

| | | |
|---|---|---|
| DE | 19914089 | 9/2000 |
| DE | 202004013056 | 12/2004 |
| EP | 0546715 | 6/1993 |
| EP | 0850106 | 7/1998 |
| FR | 2529473 | 1/1984 |
| FR | 2777807 | 10/1999 |
| WO | WO0025905 | 5/2000 |
| WO | WO2006018168 | 2/2006 |

OTHER PUBLICATIONS

International Report on Patentability dated Mar. 1, 2007, received in corresponding PCT Application No. PCT/ EP05/008558, 8 pgs.

DISPERSING APPARATUS

The invention concerns a dispersing apparatus comprising a receiving container for a dispersion material, a flow-generating device drivable by a shaft and a grinding device which contains a grinding medium and which has a perforated housing through which the dispersion material can pass by virtue of a flow generated by the flow-generating device, and an agitator tool which is drivable by a drive element and which is arranged in the housing and is rotatable relative thereto, wherein the housing encloses the shaft, wherein the housing is displaceable relative to the shaft from a raised position into a lowered position, and wherein the shaft and the drive element can be coupled together by way of a coupling which has a first element and a corresponding second element, which elements come into operative relationship in the lowered position.

An apparatus of that kind provides for the distribution of finely and very finely divided solid constituents in the liquid phase. In the dispersing process three sub-steps take place in mutually parallel relationship:

1. wetting of the surface of the solid material to be incorporated by liquid constituents of the grinding material;
2. mechanical breakdown of agglomerates into smaller agglomerates and primary particles, and
3. stabilization of primary particles, agglomerates and aggregates to prevent renewed consolidation (equal to flocculation).

To implement an economical dispersion process the dispersion material has to be pre-dispersed. Preferably it is pre-dispersed with a dissolver disc as, particularly when dealing with agglomerates which are difficult to disperse and which in the further procedure still require the use of the grinding device, optimum pre-dispersion is indispensable for economic reasons. An inadequately pre-dispersed product requires not only longer run times for the grinding device, but frequently the desired levels of fineness are not achieved. Omissions or errors in the pre-dispersing operation generally cannot be compensated or can be compensated only at a disproportionately high level of complication and expenditure by means of other systems. That is in particular because inadequately pre-dispersed products, with further use of the grinding device, cause the holes in the sieve basket to become clogged, whereby circulation through the sieve basket becomes more difficult or is even completely prevented.

Frequently however the dissolver can only implement pre-dispersion, that is to say the dispersion material can be dispersed only down to a certain degree of fineness. For further dispersion, which is referred to herein as fine dispersion, it is necessary to use an agitator ball mill or similar grinding device.

For the purposes of avoiding the container change between the pre-dispersing and the fine dispersing operations, European patent specification No 0 850 106 to the present applicants proposes that the grinding device is in the form of a housing which encloses the shaft and which is also displaceable in respect of height, relative to the shaft. During the pre-dispersing operation the grinding device is arranged in the raised position above the dispersion material; for the fine dispersing operation, the grinding device is transferred into the lowered position and moved into the dispersion material so that it is disposed just above the flow-generating device in the form of the dissolver disc. In that apparatus the drive element for the agitator tool is in the form of a hollow shaft which encloses the shaft and which is displaced together with the grinding device in the movement in relation to the shaft. An arcuate tooth coupling is operative between the shaft and the hollow shaft, the coupling transmitting the torque from the shaft to the hollow shaft only in the lowered position of the grinding device, and that hollow shaft in turn being connected non-rotatably at its lower end to the agitator tool.

That known dispersing apparatus requires a not inconsiderable degree of complication and expenditure to prevent the dispersion material from penetrating into the intermediate space between the shaft and the hollow shaft; ultimately that can never be one hundred percent avoided.

Forces of the dispersion material in the pre-dispersing operation applied to the shaft, when the grinding device is in the raised position, can give rise to unwanted deflection of the shaft through several millimeters. The result of that deflection can be that the shaft comes into contact with and damages a plain bearing arranged in the grinding device for carrying the shaft. A gap must be provided between the plain bearing and the shaft for satisfactory functionality. Even with the most accurate structure, the chain of tolerances which are added together, particularly in the case of relatively large dispersing devices, means that it is not possible to prevent the dispersion material passing through that gap into the intermediate space between the hollow shaft and the shaft. In the event of damage to the plain bearing due to the above-mentioned unwanted shaft deflection during the pre-dispersing operation, those problems are made even worse. In addition the known structure, using the hollow shaft, requires an extremely slender bearing flange which at its lower end is supported by way of a needle bearing on the pinion of the arcuate tooth coupling; in the case of larger dispersing apparatuses that slender bearing flange does not afford the required stability.

New anti-explosion regulations such as for example ATEX 95 (EU Directive 94/9/EC) for rooms which are at risk of explosion will finally soon prescribe compulsory sealing integrity in respect of the hollow space between the hollow shaft and the shaft. The above-indicated problems mean that further complication and expenditure is required for sealing off that space.

Accordingly the object of the present invention is to at least partially avoid the above-specified disadvantages, to design the dispersing apparatus in such a way that it complies with coming anti-explosion regulations, and to simplify the structure of the dispersing apparatus.

According to the invention that object is attained in that the first element of the coupling is arranged at a lower end of the housing and that the second element of the coupling is arranged in the region of a lower end of the shaft.

In accordance with the invention therefore the coupling is no longer operative above but below the grinding device. Instead, the first coupling element of the coupling is arranged in the lower end of the housing. The corresponding second coupling element of the coupling is arranged at the lower end of the shaft, just above the flow-generating device. The configuration according to the invention provides that the coupling elements are only brought into engagement in the lowered position of the grinding device and then transmit the torque of the shaft to the agitator tool. A hollow shaft which embraces the shaft is thus no longer required. Accordingly, there are also no expensive and delicate sealing packing means for sealing off the hollow shaft with respect to the shaft. That markedly simpler structure is substantially less expensive and makes it possible for the first time to afford a dissolver and an agitator ball mill combined at the same price in one unit. The structure according to the invention is in addition substantially lower in maintenance as no relatively large tolerance chains occur. Finally, because of the absence of the hollow shaft, there is no longer any need for the bearing flange to be of a slender configuration. Accordingly, with the design configuration according to the invention, the bearing flange can have corresponding reinforcing struts for affording even relatively large dispersing apparatuses the necessary stability.

Preferably the second coupling element is arranged at the lower end of the shaft immediately above the flow-generating device in order to be able to lower the grinding device as far as possible in the container.

In terms of abstraction of the idea of the invention, the coupling represents a force-transmitting element between the shaft and the housing. That coupling can be of any desired configuration.

The coupling is preferably in the form of a shaft coupling which is positively lockingly yielding but rotationally stiff, that is to say a compensating coupling. In the lowered position of the grinding device the two coupling elements fit into each other and transmit the torque. At the same time, lengthwise extension of the shafts, which occurs due to the effect of heat in operation of the arrangement, is compensated. By way of example the coupling can be in the form of a dog coupling, wherein a first dog which forms the first coupling element of the coupling is arranged at the lower end of the housing and a corresponding second dog which represents the second coupling element is arranged at the lower end of the shaft. An arcuate tooth coupling has proven to be particularly advantageous, which has a crowned external tooth arrangement on the second coupling element which is in the form of a pinion and which can move pivotably and axially in the internal tooth arrangement of the second coupling element.

In a more complex configuration, the coupling can also be in the form of a barrel coupling. Although the use of a friction coupling is basically also a possibility, the above-mentioned arcuate tooth coupling enjoys the advantage that it is very stable and inexpensive; in addition it is particularly easy to clean and is therefore advantageous in terms of maintenance procedures.

For mounting the shaft in the grinding device in the lowered position, it has proven to be particularly advantageous for the drive element which represents a force-transmitting element to be in the form of a bearing block. That bearing block accommodates either plain or rolling bearings for supporting the shaft; a double-rolling bearing is particularly maintenance-friendly and has a long bearing service life. By virtue of the provision of only a small frictional gap between the bearing block and the agitator tool, with a preferable gap size of a third of the bead diameter, in particular between 0.03 mm and 5 mm, particularly preferably 2 mm, the grinding medium is effectively prevented from passing therethrough. With the dispersing apparatus according to the invention therefore no 'bead breakage' occurs.

The dispersion material, that is to say the product flow, can be used for cooling and preventing the bearings from running dry, in order to achieve a long bearing service life. For that purpose the dispersion material passes in through the above-mentioned gap at the upper end of the bearing block and flows through the bearings to the lower end thereof. The resulting product flow of the medium effectively prevents partial heating of the product and damage to the dispersing apparatus. At the same time however the product flow is sufficiently great to permit simple and quick cleaning upon a change in product.

To increase the flow speed and thus also the cooling capacity, a conveyor screw can be arranged between the rolling bearings in the case of a doubled rolling bearing.

In addition, for further enhancing the flow speed, it is advantageous if, above the second coupling element, the bearing block has at least one suction bore through which the product flow is drawn by means of the flow-generating device.

It is particularly advantageous in terms of maintenance procedure for the bearing block to be integrated into the base of the housing of the grinding device. For example the bearing block can be easily replaced and cleaned by replacing the circular disc at the lower end of the grinding basket.

The shaft can have an upper and a lower portion, wherein the lower portion is of a slightly wider outside diameter than the upper portion. That ensures, in the raised position of the grinding device, that there is a sufficient gap between the bearing block and the shaft, to avoid damage to the bearing block. In the lowered position in contrast the bearing block rests on the lower portion of the shaft of the wider outside diameter and thus ensures satisfactory sealing integrity between the bearing block and the shaft.

As already mentioned above the bearing block, in the lowered position, transmits the shaft torque to the agitator tool within the housing of the grinding device. The agitator tool can be of a design configuration which depends on the dispersing task involved. It can be for example in the form of a circular ring disc, a circular ring apertured disc, or a slit disc. The use of pins is also possible. Preferably the agitator tool has at least one circular ring disc which extends in coaxial relationship within the housing. The agitator tool thus ensures a continuous movement of the grinding medium disposed in the housing.

In an advantageous configuration of the invention the flow-generating device has dispersing means. It is particularly advantageous if those dispersing means are in the form of a dissolver disc. Then, on the one hand the dissolver disc generates the flow necessary for operation of the dispersing apparatus and in addition effects pre-dispersing of the grinding medium. The dissolver disc performs a particularly important function in regard to the dispersing effect, namely uniform circulation of product into the edge zone of the mixing container. A dissolver disc performs the functions of the dispersing operation, that is to say breaking up agglomerates and wetting the primary particles in the liquid phase, in a particularly economic manner, as the dispersing operation is completed markedly more quickly than within the grinding device.

Accordingly the dispersing apparatus according to the invention is designed in such a way that the grinding device is adjustable in respect of height and by means of the heightwise adjustment it can be dipped into the dispersion material and can be completely removed therefrom again.

In that way, the individual method steps involved in pre-dispersing and fine dispersing can be effected completely separately from each other, without in that case the substances which are to be dispersed having to be removed from the container or without the need for a change in the agitator tools. A change between pre-dispersing and fine dispersing can be effected particularly quickly and economically.

Figure 2:
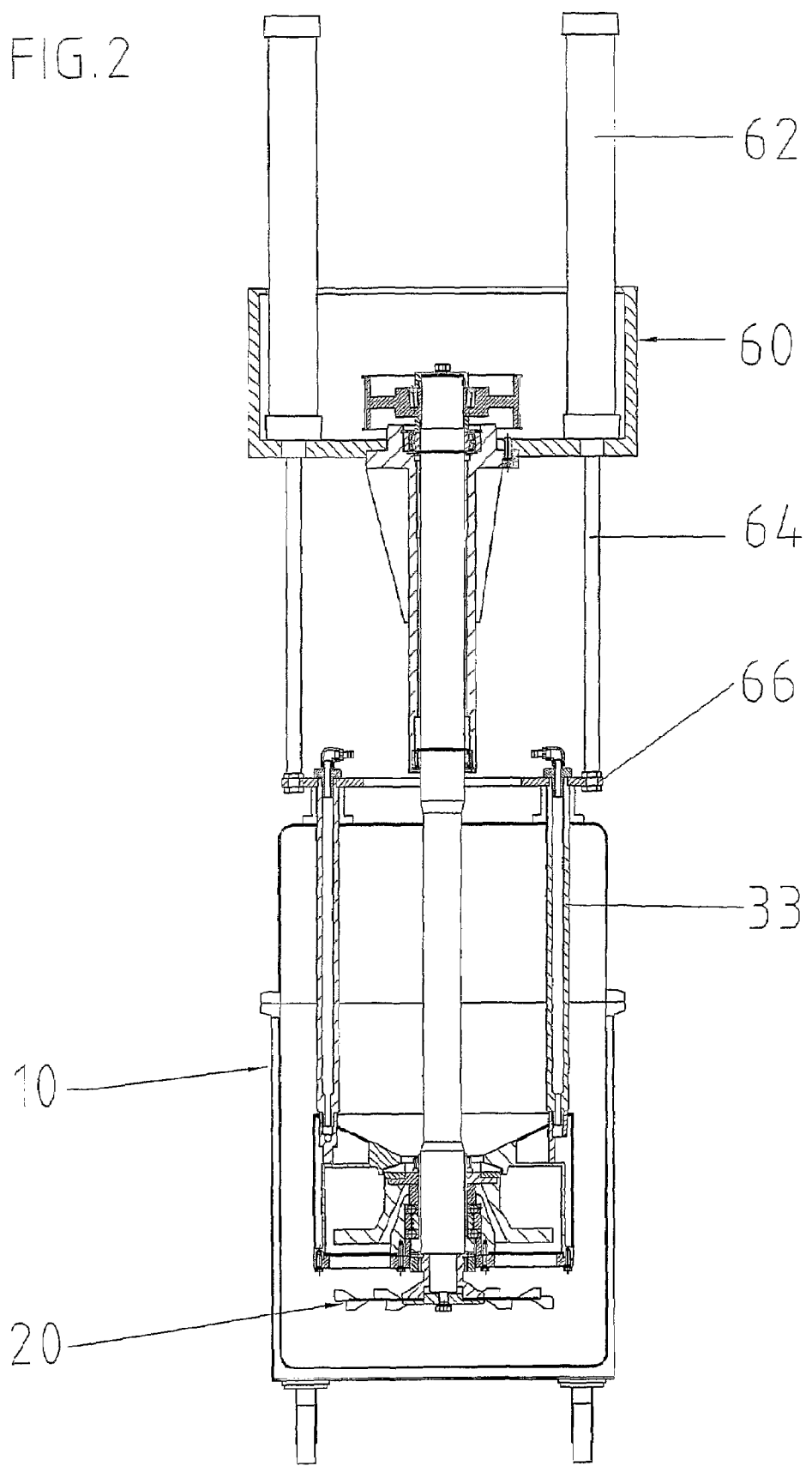
Figure 3:
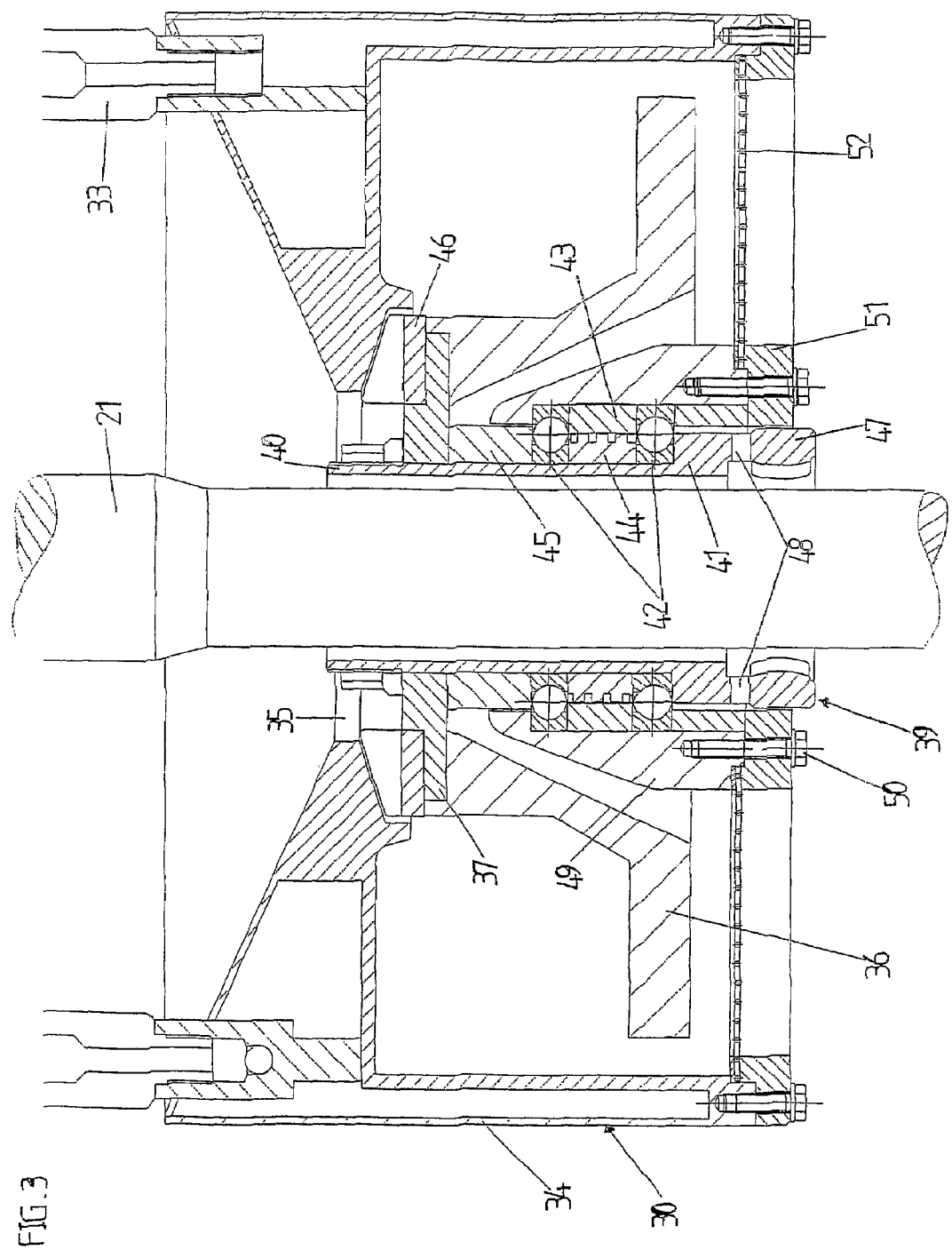

The invention is illustrated by way of example in the drawing and described hereinafter in detail with reference thereto. In the drawing:

FIG. 1 shows a view in cross-section through the dispersing device according to the invention with the grinding device in the raised pre-dispersing position, FIG. 2 shows the dispersing apparatus of FIG. 1 with the grinding device in the lowered fine dispersing position, and FIG. 3 shows a view on an enlarged scale in cross-section of the grinding device of FIG. 1.

Accordingly the dispersing apparatus according to the invention comprises a substantially cylindrical, double-wall container 10 which is closable with a cover, a dissolver 20 and an agitator ball mill 30. A cleaning device which is not shown in detail here can also be arranged in the container.

The dissolver 20 comprises a cylindrical shaft 21 which has a dissolver disc 22 at its lower end. The dissolver disc 22 is provided along its periphery with a plurality of teeth 23 which are bent alternately upwardly and downwardly on the circular surface. The shaft 21 has a central portion 24, of a first outside diameter, which at its lower end goes into a lower portion 25 whose outside diameter is greater than that of the central portion.

The shaft 21 is fixed by way of a cylindrical bearing flange 26 to an upper machine portion 60 which encloses the bearing flange in a box-like fashion. To guarantee the necessary stability, the bearing flange 26 preferably extends over more than a third of the total shaft length. In the present embodiment, the agitator ball mill 30 is adjustable in respect of height by way of pneumatic cylinders 62, the piston rods 64 of which are mounted to an intermediate plate 66. A plurality of hollow bars 33 extend from the underside of the intermediate plate 66 to the upper end of the agitator ball mill 30. By virtue of that configuration, the arrangement of the agitator ball mill 30 can be displaced vertically by means of the pneumatic cylinders 62; in addition, the coolant can circulate in the agitator ball mill 30 by way of the hollow bars. Instead of the pneumatic cylinders, it is possible to use other adjustment means such as for example hydraulic cylinders or a worm drive.

The shaft 21 is supported in the bearing flange 26 by way of rolling bearings, wherein a needle bearing or roller bearing 27 is provided at the lower end of the bearing flange 26 and a double self-aligning bearing 28 at the upper end. The shaft 21 is driven in known manner by way of a belt pulley 29. To reinforce the bearing flange 26, a plurality of stiffening ribs 32 are provided at the upper end in peripherally mutually displaced relationship. The ribs 32 extend from approximately the centre of the bearing flange 26 to the horizontal flange which is the upper flange in the installation position, at a continuous slope. Those stiffening ribs 32 impart a markedly higher level of stability to the bearing flange 26 in comparison with the bearing flanges known from the state of the art in order to prevent unwanted deflection of the shaft 21, in particular in the pre-dispersing operation.

The agitator ball mill 30 is fixed by way of a plurality of cylindrical hollow bars 33 which are peripherally spaced relative to each other to the underside of the upper machine portion 60 by way of the intermediate plate 66 so that the agitator ball mill 30 is adjustable in respect of height, with the upper machine portion 60, by means of the pneumatic cylinders 62. Instead of the pneumatic cylinders it is also possible to use other adjustment means such as for example hydraulic cylinders or a worm drive.

The agitator ball mill 30 itself comprises a housing 34 which is perforated sieve-like and in which grinding balls (not shown) are held. At its upper end, the housing 34 is provided with a funnel which at its base has an opening 35 through which the shaft 21 passes. The housing 34 can be of a single-wall structure, a double-wall structure or can be of another suitable structure. The housing 34 forms an annular passage with the central hole 35. A circular ring disc 36 is disposed within the annular passage extending in coaxial relationship therewith.

At its upper end the circular ring disc 36 is connected by way of a ring disc 37 to a bearing block which is identified generally by reference 39. That bearing block comprises a cylindrical bush 40 which is centered on the lower shaft portion 25 in the lowered position and which at its lower end has an outwardly enlarging step 41. A double rolling bearing 42 is supported on the step 41, the bearings being spaced from each other by an outside spacer ring 43. Arranged radially inwardly from the spacer ring 43 between the bearings of the double rolling bearing 42 is a conveyor screw 44. The double rolling bearing 42 is supported at the top side relative to the underside of the ring disc 37 by way of a further spacer ring 45. A bladed impeller 46 is arranged on a radially external step of the ring disc 37 in order to provide an increased flow of product out of the container into the housing 34 and at the same time to prevent unwanted escape of the grinding balls out of the agitator ball mill in operation of the assembly. Provided at the lower end of the bearing block 39 beneath the step 41 of the bush 40 is the internal tooth arrangement 47 of an arcuate tooth coupling representing the first coupling element for transmission of torque from the shaft 21 to the ring disc 36. A plurality of suction bores 48 are arranged in peripherally mutually spaced relationship between the internal tooth arrangement 47 and the step 41 of the bush 40. Radially outwardly the bearings of the double rolling bearing arrangement 42 are supported against the inside of a hollow truncated cone 49 which tapers continuously from its lower cylindrical portion to its upper end and which is supported with an internal step on the upper bearing of the double rolling bearing 42.

Between the inside of the upper end of the hollow truncated cone 49, above the upper bearing, there is a gap of approximately 0.3 mm between the hollow truncated cone 49 and the second spacer ring 45. The product flow can pass through that gap during operation for cooling the bearings and preventing them from running dry. That configuration prevents the ingress of beads or grinding balls and thus also prevents the feared 'bead breakage'. The product flow flows continuously through the bearings to provide a self-cooling effect, due to the conveyor screw 44 and the suction bores 48.

The hollow truncated cone is screwed by way of a plurality of peripherally arranged screws 50 to an inner ring element of a circular disc portion 51. That disc portion 51 forms the base of the agitator ball mill 30 and accommodates a sieve 52 which extends from an inner ring element of the disc portion 51 radially outwardly to an outer ring element. The medium flows through that sieve 52 during the fine dispersing operation and separates the ground material from the beads.

Provided above the dissolver disc 22 and below the lower shaft portion 25 is an external tooth arrangement 53 forming the second coupling element. Upon downward movement of the agitator ball mill 30 out of the pre-dispersing position shown in FIG. 1 into the fine dispersing position shown in FIG. 2 the bush 40 is displaced on to the lower shaft portion 25 until the internal tooth arrangement 47 comes into engagement with the external tooth arrangement 53. The arcuate tooth coupling now transmits the shaft torque to the circular ring disc 36 for performing the fine dispersing operation.

The configuration of the upper shaft portion 24 which is of a smaller outside diameter than the lower shaft portion 25 ensures that there is a sufficient gap between the shaft 21 and the agitator ball mill 30 in the pre-dispersing position to prevent undesirable damage to the bush 40 due to possible lateral deflection movements of the shaft 21 during the pre-dispersing operation.

The arrangement according to the invention of the coupling at the lower end of the agitator ball mill makes it possible to dispense with the hollow shaft found in the state of the art, but at the same time further to combine a pre-dispersing device and a fine dispersing device in one unit, wherein the change between the method steps can be effected simply by lowering the agitator ball mill within the container without the container having to be opened. Instead of a positively locking coupling, it will be appreciated that it is also possible to use a coupling involving a force-locking relationship to carry the idea of the invention into effect, such as for example a plate coupling or the like. Finally, instead of rolling bearings in the bearing block, it is also possible to use plain bearings.

LIST OF REFERENCES 10 container
20 dissolver
21 shaft
22 dissolver disc
23 teeth
24 central shaft portion
25 lower shaft portion
26 bearing flange
27 needle bearing
27 roller bearing
28 double self-aligning bearing
29 pulley
30 agitator ball mill
32 stiffening ribs
33 hollow bar
34 housing
35 opening
36 circular ring disc
37 ring disc
39 bearing block
40 bush
41 step
42 double rolling bearing
43 spacer ring
44 conveyor screw
45 spacer ring
46 impeller
47 internal tooth arrangement
48 suction bore
49 hollow truncated cone
50 screw
51 circular disc portion
52 sieve
53 external tooth arrangement
60 upper machine portion
62 pneumatic cylinder
64 piston rods
66 intermediate plate

The invention claimed is:

1. A dispersing apparatus for arrangement in a container for a dispersion material, comprising a flow-generating device drivable by a shaft and a grinding device which contains a grinding medium and which has a perforated housing through which the dispersion material can pass by virtue of a flow generated by the flow-generating device, and an agitator tool which is drivable by a drive element and which is arranged in the housing and is rotatable relative thereto, wherein the housing encloses the shaft, wherein the housing is displaceable relative to the shaft from a raised position into a lowered position, and wherein the shaft and the drive element can be coupled together by way of a coupling which has a first element and a corresponding second element, which elements come into operative relationship in the lowered position, characterized in that the first coupling element is arranged at a lower end of the housing and that the second coupling element is arranged in the region of a lower end of the shaft.

2. A dispersing apparatus according to claim 1 characterized in that the second coupling element is arranged at the lower end of the shaft.

3. A dispersing apparatus according to claim 1 characterized in that the coupling is in the form of a longitudinally movable compensating coupling.

4. A dispersing apparatus according to claim 1 characterized in that the drive element includes a bearing block.

5. A dispersing apparatus according to claim 4 characterized in that the bearing block has a double rolling bearing.

6. A dispersing apparatus according to claim 5 characterized in that a conveyor screw is disposed between the rolling bearings.

7. A dispersing apparatus according to claim 4 characterized in that the bearing block has at least one suction bore above the second coupling element.

8. A dispersing apparatus according to claim 4 characterized in that the bearing block is integrated into the base of the housing.

9. A dispersing apparatus according to claim 1 characterized in that the shaft has a central portion and a lower portion and that the lower portion is of a larger outside diameter than the central portion.

10. A dispersing apparatus according to claim 1 characterized in that the flow-generating device is in the form of a dissolver disc.

* * * * *

UNITED STATES PATENT AND TRADEMARK OFFICE
CERTIFICATE OF CORRECTION

PATENT NO. : 7,641,137 B2  Page 1 of 1
APPLICATION NO. : 11/573810
DATED : January 5, 2010
INVENTOR(S) : Frank Schieweg It is certified that error appears in the above-identified patent and that said Letters Patent is hereby corrected as shown below:

On the Title Page, Item (73), Assignee, line 1-2, delete "VMA-Getzmann GmbH" and insert -- VMA-Getzmann GmbH Verfahrenstechnik --, therefor.

On the Title Page, Item (57), Abstract, line 15, delete "than" and insert -- that --, therefor.

Signed and Sealed this

Sixth Day of April, 2010

David J. Kappos
*Director of the United States Patent and Trademark Office*